United States Patent
Huang et al.

(10) Patent No.: US 8,203,833 B2
(45) Date of Patent: Jun. 19, 2012

(54) LAPTOP COMPUTER AND HINGE MODULE WITH ANGLE DETECTOR THEREOF

(75) Inventors: Yung-Jen Huang, Taipei (TW); Yi-Hung Shen, Taipei (TW); Cheng-Hsi Wu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 341 days.

(21) Appl. No.: 12/698,145

(22) Filed: Feb. 2, 2010

(65) Prior Publication Data
US 2011/0161710 A1 Jun. 30, 2011

(30) Foreign Application Priority Data
Dec. 31, 2009 (TW) ................. 98146553 A

(51) Int. Cl.
*G06F 1/16* (2006.01)

(52) U.S. Cl. .............. 361/679.2; 455/556.2; 345/157; 248/125.8

(58) Field of Classification Search .......... 455/566, 455/90.3, 575.4, 556.2, 556.1, 575.3; 345/156, 345/168, 1.3, 169, 157, 204, 87, 8; 248/159, 248/450, 419, 122.1, 125.8, 285.1, 176.1; 16/367, 338, 382, 325, 366, 316, 321; 361/679.41, 361/679.55, 679.16, 679.03, 679.27, 679.26, 361/679.04, 679.07, 679.05, 679.06, 679.22
See application file for complete search history.

(56) References Cited

U.S. PATENT DOCUMENTS

| | | | |
|---|---|---|---|
| 6,525,932 B1 * | 2/2003 | Ohnishi et al. | 361/679.41 |
| 2007/0230723 A1 * | 10/2007 | Hobson et al. | 381/300 |
| 2009/0244832 A1 * | 10/2009 | Behar et al. | 361/679.55 |

* cited by examiner

*Primary Examiner* — Hung Duong
(74) *Attorney, Agent, or Firm* — CKC & Partners Co., Ltd.

(57) ABSTRACT

A laptop computer includes a main body, a display device, a hinge module and an angle detector. The hinge module is pivotally interconnected between the display device and the main body such that the display device is swiveled relative to the main body to be folded against or unfolded away from the main body. The hinge module includes a first hinge component and a second hinge component. The first hinge component is secured to the main body. The second hinge component is pivotally connected with the first hinge component and includes an end secured to the display device. The angle detector is coupled with an opposite end of the second hinge component for measuring a rotation angle of the second hinge component.

12 Claims, 5 Drawing Sheets

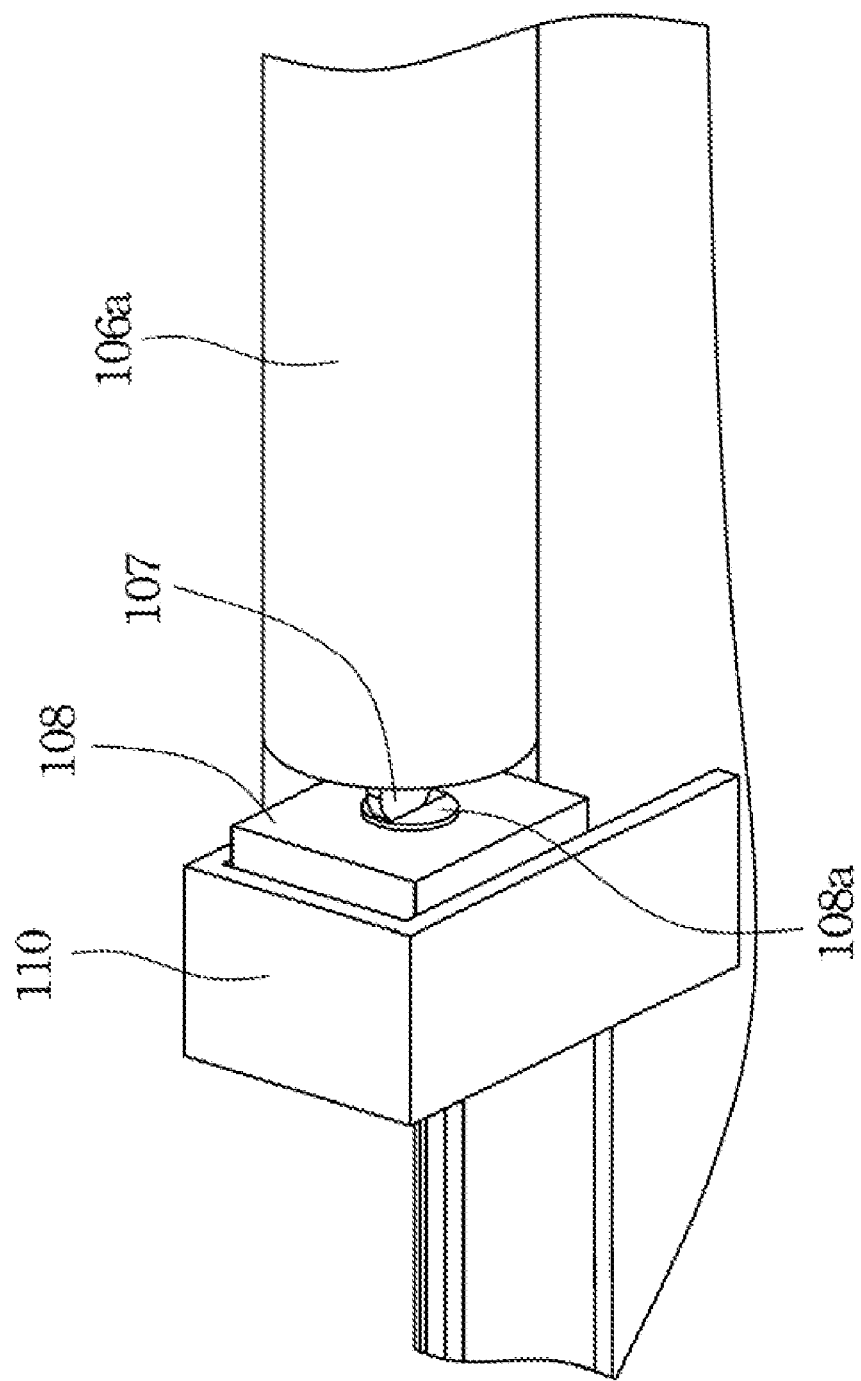

LAPTOP COMPUTER AND HINGE MODULE WITH ANGLE DETECTOR THEREOF

RELATED APPLICATIONS

This application claims priority to Taiwan Application Serial Number 98146553, filed Dec. 31, 2009, which is herein incorporated by reference.

BACKGROUND

1. Field of Invention

The present invention relates to a computer device. More particularly, the present invention relates to a laptop computer device.

2. Description of Related Art

A laptop computer has become a popular type of computer device in the market because its lightweight and smaller size compared with a desktop computer. A laptop computer often includes a main body and a display device, which are pivotally interconnected with each other, such that the display device can be swiveled to a desired position relative to the main body according to a demand.

A conventional laptop computer switches into a sleep mode or stand-by mode when its display device is folded close to its main body. A switch or sensor is installed on the main body or the display device to be activated and to activate the sleep mode or stand-by mode when the display device is folded against the main body.

However, such design is limited in the rotation range where the display device is folded close to the main body. The remaining rotation range, e.g. an included angle between the main body and the display device is over 30 degrees, cannot be used to activate any functions, e.g. switching off the display device's power, due to the limitations of the currently used switch or sensor.

For the forgoing reasons, there is a need for improving the related mechanisms of a laptop computer.

SUMMARY

It is therefore an objective of the present invention to provide a laptop computer equipped with an angle measuring hinge module so as to solve the above-discussed issues.

In accordance with the foregoing and other objectives of the present invention, a laptop computer includes a main body, a display device, a hinge module and an angle detector. The hinge module includes a first hinge component and a second hinge component. The first hinge component is secured to the main body. The second hinge component is pivotally connected with the first hinge component and includes an end secured to the display device. The angle detector is coupled with an opposite end of the second hinge component for measuring a rotation angle of the second hinge component.

In accordance with the foregoing and other objectives of the present invention, a hinge module with an angle measuring function includes a first hinge component, a second hinge component and an angle detector. The first hinge component is secured to a main body of a computer. The second hinge component is pivotally connected with the first hinge component and includes an end secured to a display device of the computer. The angle detector is coupled with an opposite end of the second hinge component so as to measure a rotation angle of the second hinge component.

According an embodiment disclosed herein, the angle detector is a potentiometer to output a voltage associated with a corresponding rotation angle.

According another embodiment disclosed herein, the potentiometer is a rotatable variable resistor.

According another embodiment disclosed herein, the potentiometer includes a rotor to be rotated by the second hinge component to adjust a resistance thereof, and the rotor includes a concave groove.

According another embodiment disclosed herein, the opposite end of the second hinge component includes an cross-section to engage with the concave groove.

According another embodiment disclosed herein, a controller is electrically connected to the angle detector so as to control a power on/off switching of the display device.

According another embodiment disclosed herein, an angle setting module is electrically connected to the controller so as to preset an included angle threshold between the main body and display device for power on/off switching of the display device.

Thus, the disclosure herein provides a new design using a rotatable variable resistor to replace a conventional switch or sensor for dealing a limited rotation range and limited applications, e.g. when the display device is close to the main body of the laptop computer, a predetermined function can be activated. When the display device is swiveled relative to the main body of the laptop computer, the rotatable variable resistor outputs a variable resistance. A controller measures "the included angle between the main body and display device" by measuring an associated output voltage. In addition, users may use software applications to set "what orders or functions will be executed at what included angle?" to expand the applications for wider various rotation range of "the included angle between the main body and display device".

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The to drawings illustrate embodiments of the invention and, together with the description, serve to explain the principles of the invention. In the drawings.

FIG. 2A illustrates a perspective view of an angle detector assembled to a first hinge component as illustrated in FIG. 2;

DESCRIPTION OF THE EMBODIMENTS

Figure 1:
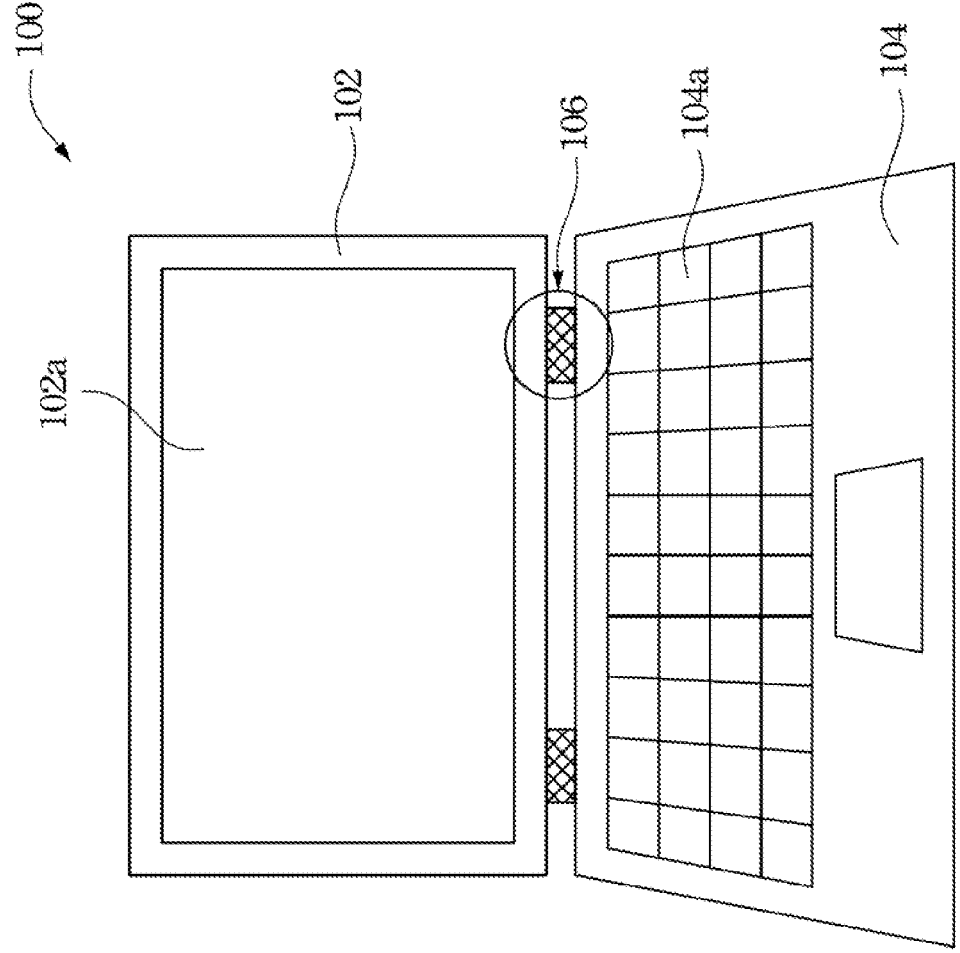
FIG. 1 illustrates a laptop computer according to one embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, which illustrates a laptop computer according to one embodiment of this invention. The laptop computer 100 includes a main body 104 and a display device 102. The display device 102 is pivotally connected with the main body 104 by two hinge modules 106 (a right one and a left one) such that the display device 102 can be swiveled relative to the main body 104 to be folded against or unfolded away from the main body 104. The display device 102 is at least equipped with a display screen 102a in order to output visual information for users. The main body 104 is at least equipped with a keyboard 104a and a cursor control module to be input information by users. In this embodiment, an included angle threshold between the main body 104 and display device 102 is utilized to control power on/off switching of the display device 102, or whether the main body 104 is switched into a sleep mode, stand-by mode or other desired functions. The embodiments below further describe the details of mechanisms and methods.

Figure 2:
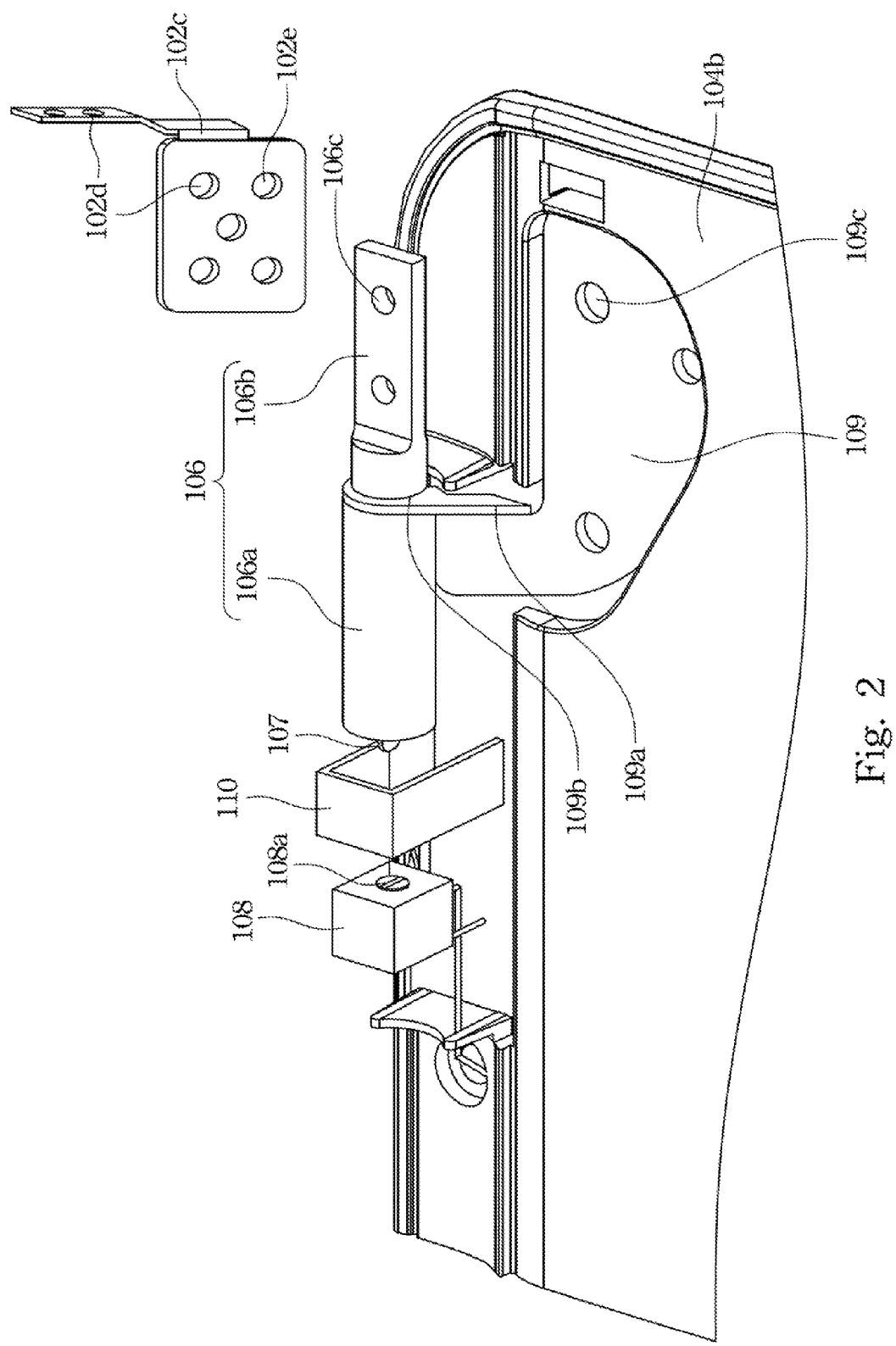
FIG. 2 illustrates a perspective view of a hinge module of a laptop computer according to one embodiment of this invention.
Figure 2B:
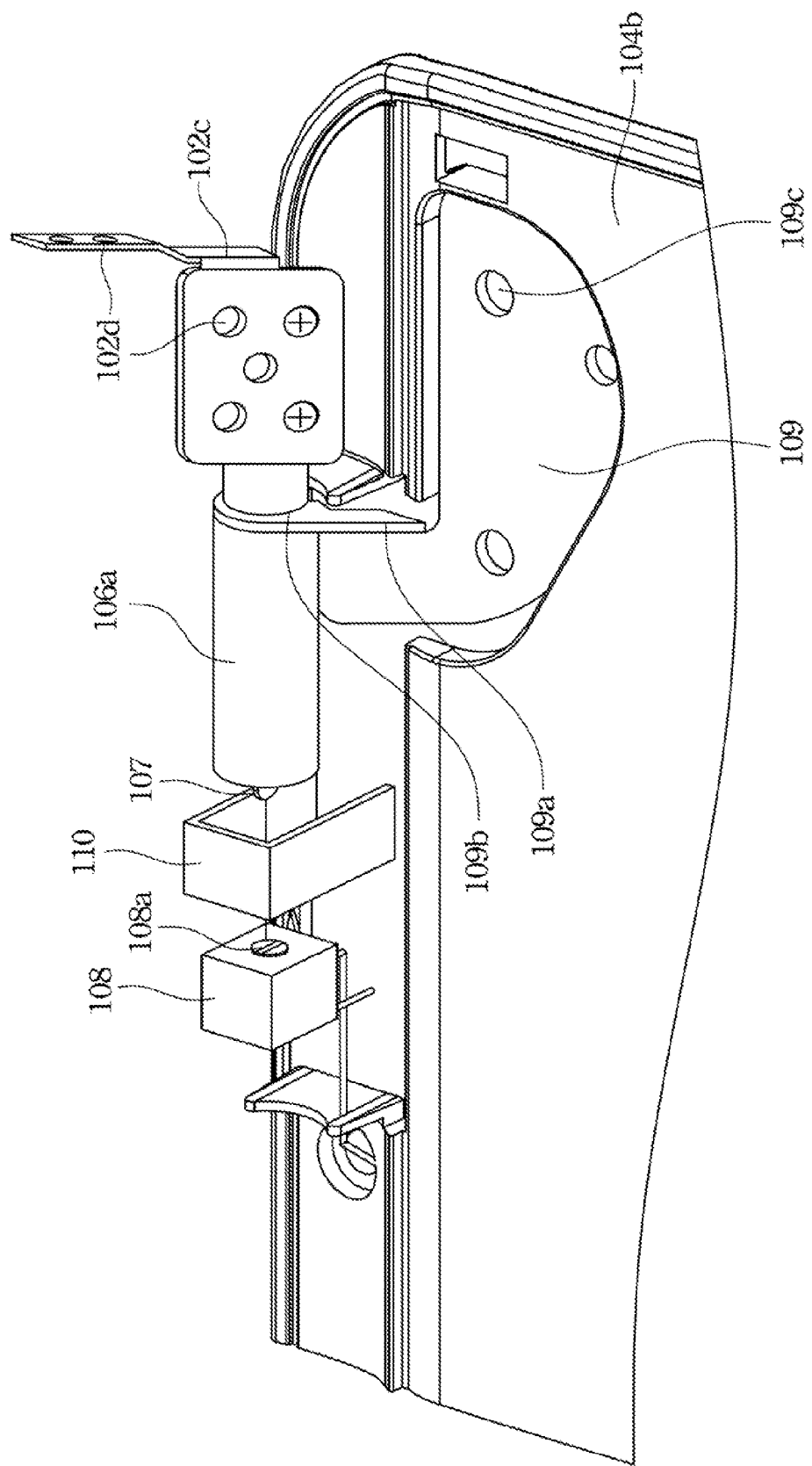
FIG. 2B illustrates a perspective view of a positioning bracket assembled to a second hinge component as illustrated in FIG. 2.

Referring to FIG. 2, which illustrates a perspective view of a hinge module of a laptop computer according to one embodiment of this invention. In this embodiment, the hinge module includes a first hinge component 109 and a second hinge component 106. The first hinge component 109 is secured to a housing 104b of the main body 104 by screwing through screw holes 109c. A middle part of the second hinge component 106 is pivotally connected with a vertical member 109a of the first hinge component 109 by inserting through a through hole 109b. An end portion 106b of the second hinge component 106 is secured to a fastening bracket 102c by screwing through screw holes 106c. The lower two screw holes 102e of the fastening bracket 102c are aligned with two screw holes 106c before the fastening bracket 102c can be secured to the second hinge component 106. The fastening bracket 102c further includes screw holes 102d to be screwed to a housing of the display device 102. FIG. 2B illustrates the perspective view of the fastening bracket 102c assembled to the second hinge component 106. An opposite end portion 106a of the second hinge component 106 has a connection member 107 with a cross-section, e.g. an "I"-shaped cross-section. According to the design of the hinge module herein, the display device 102 is swiveled relative to the main body 104 by means of a rotation relationship of the first and second hinge components (106 and 109).

In this embodiment, an angle detector 108 is installed adjacent to the second hinge component 106 in order to measure a rotation angle of the second hinge component 106 relative to the first hinge component 109, namely, to measure an included angle between the main body 104 and the display device 102. The angle detector 108 is a potentiometer, which is rotated by the second hinge component 106 to output a divided voltage associated with a corresponding rotation angle of the second hinge component 106. The potentiometer can be a rotatable variable resistor equipped with three electrodes and a rotor 108a to be rotated by the second hinge component 106 to adjust resistance thereof. The rotor 108a has a concave groove, e.g. an "I"-shaped groove, to be engaged by the cross-section of the connection member 107 such that the rotor 108a rotates along with the second hinge component 106. When the angle detector 108 is assembled to the second hinge component 106, the angle detector 108 is secured within the mounting member 110 (as illustrated in FIG. 2A). Two electrodes of the angle detector 108 are biased by a predetermined voltage, e.g. 3V. When the resistance of the angle detector 108 varies, i.e. the rotor 108a is rotated, the third electrode outputs a different voltage, e.g. 0V-3V. With this regard, "the included angle between the main body 104 and display device 102" is proportional to a variable resistance value of the angle detector 108. That is, the larger the included angle between the main body 104 and display device 102 is, the greater the resistance value and output voltage are. Variable output voltages of the angle detector 108 are then utilized to activate different functions of the laptop computer, which are further described below.

Figure 3:
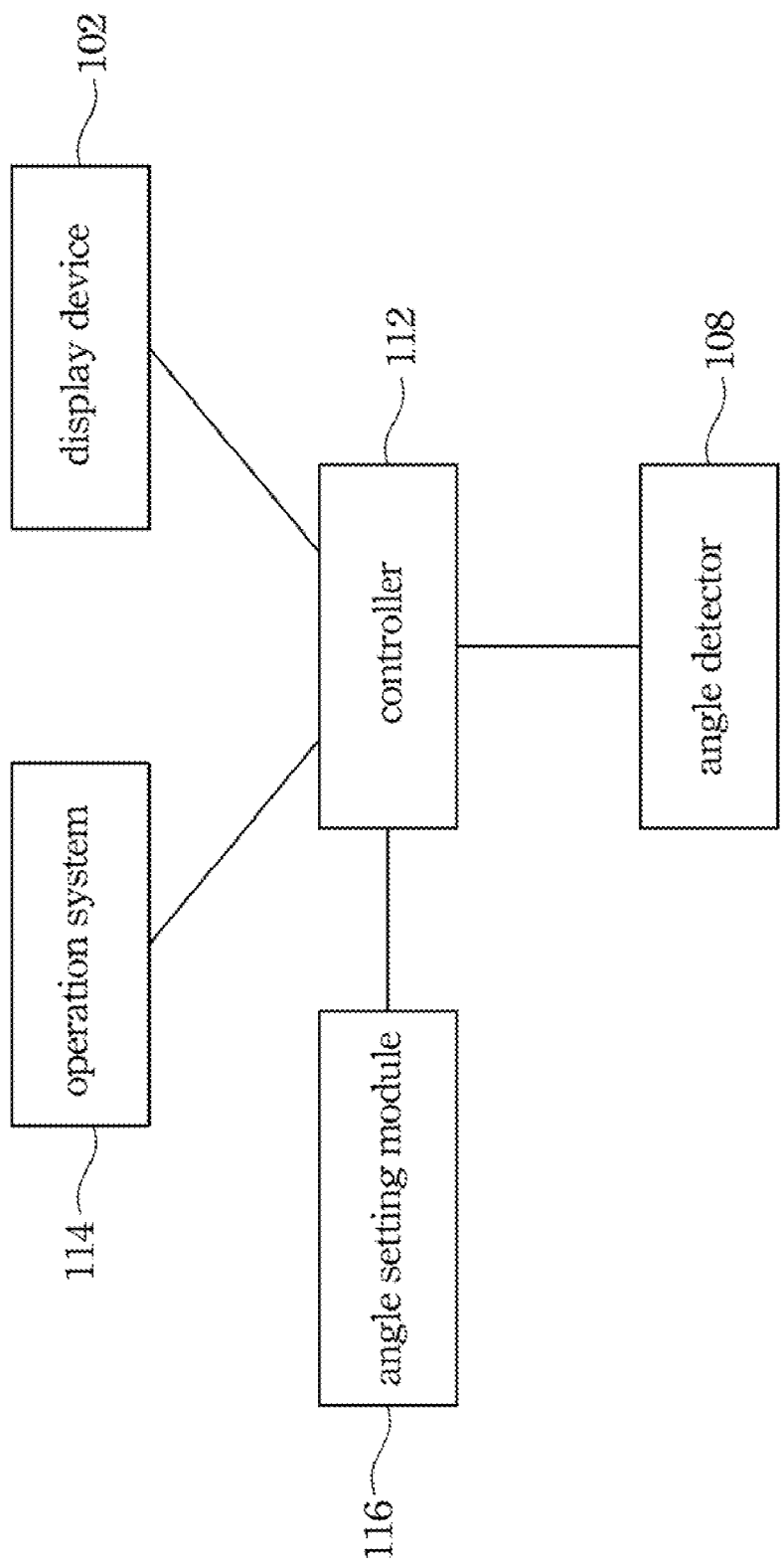
FIG. 3 illustrates a functional block diagram according to one embodiment of this invention.

Referring to FIG. 3, which illustrates a functional block diagram according to one embodiment of this invention. Various applications of variable output voltages of the angle detector 108 are explained using this functional block diagram. A controller 112 is electrically connected with the angle detector 108 to obtain variable output voltages of the angle detector 108. The controller 112 also executes different orders according to different included angles, i.e. the included angle between the main body 104 and display device 102. The included angle can be written into the controller 112 or preset by using an angle setting module 116. The angle setting module 116 can be a software application for setting "what orders or functions will be executed at what included angle threshold?" For example, a user may set a scenario of "switching off the display device's power at the included angle under 50 degrees". When the included angle between the main body 104 and display device 102 is less than 50 degrees, the controller 112 reads the associated voltage and issues the order of "switching off the display device's power". For example, another user may set a scenario of "enabling a sleep mode at the included angle under 30 degrees". When the included angle between the main body 104 and display device 102 is less than 30 degrees, the controller 112 reads the associated voltage and issues the order of "an operation system 114 switching into a sleep mode". Persons skilled in the art may still utilize "the included angle between the main body and display device" to design other applications than the above-mentioned examples so as to enable the user to operate the laptop computer more conveniently than ever.

According to the above-discussed embodiments, the disclosure herein provides a new design hinge module using a rotatable variable resistor to replace a conventional switch or sensor for dealing a limited rotation range and limited applications, e.g. only when the display device is close to the main body of the laptop computer, a predetermined function can be activated. When the display device is swiveled relative to the main body of the laptop computer, the rotatable variable resistor outputs a variable resistance. A controller measures "the included angle between the main body and display device" by measuring an associated output voltage. In addition, users may use software applications to set "what orders or functions will be executed at what included angle threshold?" to expand the applications for wider various rotation range of "the included angle between the main body and display device".

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A laptop computer comprising:
   a main body;
   a display device;
   a hinge module comprising:
     a first hinge component secured to the main body; and
     a second hinge component pivotally connected with the first hinge component and comprising an end secured to the display device; and
   an angle detector, coupled with an opposite end of the second hinge component, for measuring a rotation angle of the second hinge component.

2. The laptop computer of claim 1, wherein the angle detector is a potentiometer to output a voltage associated with the rotation angle.

3. The laptop computer of claim 2, wherein the potentiometer is a rotatable variable resistor.

4. The laptop computer of claim 3, wherein the potentiometer comprises a rotor to be rotated by the second hinge component to adjust a resistance thereof, and the rotor comprises a concave groove.

5. The laptop computer of claim 4, wherein the opposite end of the second hinge component comprises a cross-section to engage with the concave groove.

6. The laptop computer of claim 1, further comprising a controller, electrically connected to the angle detector, for controlling a power on/off switching of the display device.

7. A hinge module with an angle detecting function comprising:
 a first hinge component secured to a main body of a computer;
 a second hinge component pivotally connected with the first hinge component and comprising an end secured to a display device of the computer; and
 an angle detector coupled with an opposite end of the second hinge component so as to measure a rotation angle of the second hinge component.

8. The laptop computer of claim 7, further comprising an angle setting module, electrically connected to the controller, for presetting an included angle threshold between the main body and display device.

9. The hinge module of claim 8, wherein the angle detector is a potentiometer to output a voltage associated with a corresponding rotation angle.

10. The hinge module of claim 9, wherein the potentiometer is a rotatable variable resistor.

11. The hinge module of claim 10, wherein the potentiometer comprises a rotor to be rotated by the second hinge component to adjust a resistance thereof, the rotor comprises a concave groove.

12. The hinge module of claim 11, wherein the opposite end of the second hinge component comprises a cross-section to engage with the concave groove.

* * * * *